(12) United States Patent
Nakajima et al.

(10) Patent No.: US 12,737,068 B2
(45) Date of Patent: Sep. 15, 2026

(54) ELECTROSTATIC INPUT DEVICE

(71) Applicant: Alps Alpine Co., Ltd., Tokyo (JP)

(72) Inventors: Satoshi Nakajima, Miyagi-ken (JP); Kohei Kitagawa, Miyagi-ken (JP); Shogo Ujikawa, Miyagi-ken (JP); Masaya Sugawara, Miyagi-ken (JP); Zhiyuan Chen, Miyagi-ken (JP); Shunichi Watanabe, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 19/090,513

(22) Filed: Mar. 26, 2025

(65) Prior Publication Data

US 2025/0306697 A1 Oct. 2, 2025

(30) Foreign Application Priority Data

Mar. 27, 2024 (JP) ................................ 2024-051519

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC ............................... G06F 3/0416; G06F 3/044
See application file for complete search history.

(56) References Cited

U.S. PATENT DOCUMENTS 9,280,265 B2 * 3/2016 Mochizuki ............ G06F 3/0483
9,529,527 B2 * 12/2016 Yamamoto .......... G06F 3/04883
10,990,224 B2 * 4/2021 Nomura .............. G06F 3/04186
11,243,639 B2 * 2/2022 Nomura .............. G06F 3/04186
11,755,114 B2 * 9/2023 Mitani ................ G06F 3/04842 345/157
12,340,044 B2 * 6/2025 Yoshida ................ G06F 3/0446
12,340,050 B2 * 6/2025 Nakanishi ............. G06F 3/0418
2013/0100049 A1 * 4/2013 Mochizuki ............ G06F 3/0483 345/173
2013/0100050 A1 * 4/2013 Profitt ................. G06F 3/04845 345/173
2013/0100051 A1 * 4/2013 Mochizuki .......... G06F 3/04842 345/173

(Continued)

FOREIGN PATENT DOCUMENTS

CN 118689337 A * 9/2024 ......... G02F 1/13338
JP 2012-185538 A 9/2012

(Continued)

*Primary Examiner* — Michael Pervan

(74) *Attorney, Agent, or Firm* — Harness, Dickey & Pierce, P.L.C.

(57) ABSTRACT

An electrostatic input device includes a plurality of electrostatic sensor electrodes arrayed in one direction, a measurement circuit configured to measure a capacitance between each of the plurality of electrostatic sensor electrodes and an operation body, a storage unit, and a control unit configured to calculate a position of the operation body based on a capacitance correction value obtained by subtracting a reference value from the capacitance measured by the measurement circuit, determine whether the operation body is close to at least one of the plurality of electrostatic sensor electrodes based on the capacitance correction value, and calculate a direction of movement and an amount of movement of the operation body.

7 Claims, 9 Drawing Sheets

(56) References Cited

U.S. PATENT DOCUMENTS

| | | | | |
|---|---|---|---|---|
| 2015/0002424 | A1* | 1/2015 | Yamamoto | G06F 3/04883 345/173 |
| 2018/0181255 | A1* | 6/2018 | Nomura | G06F 3/0446 |
| 2021/0216189 | A1* | 7/2021 | Nomura | G06F 3/04186 |
| 2022/0197385 | A1* | 6/2022 | Mitani | G06F 3/016 |
| 2024/0241593 | A1* | 7/2024 | Yoshida | G06F 3/041 |
| 2024/0319820 | A1* | 9/2024 | Nakanishi | G06F 3/0418 |

FOREIGN PATENT DOCUMENTS

| | | | | |
|---|---|---|---|---|
| WO | 2005-057546 | A1 | 6/2005 | |
| WO | WO-2015153668 | A1 * | 10/2015 | G06F 3/0418 |

* cited by examiner 100
105
105A
110, 120
121
111
111A
FT
+
−
101
X
Y
Z

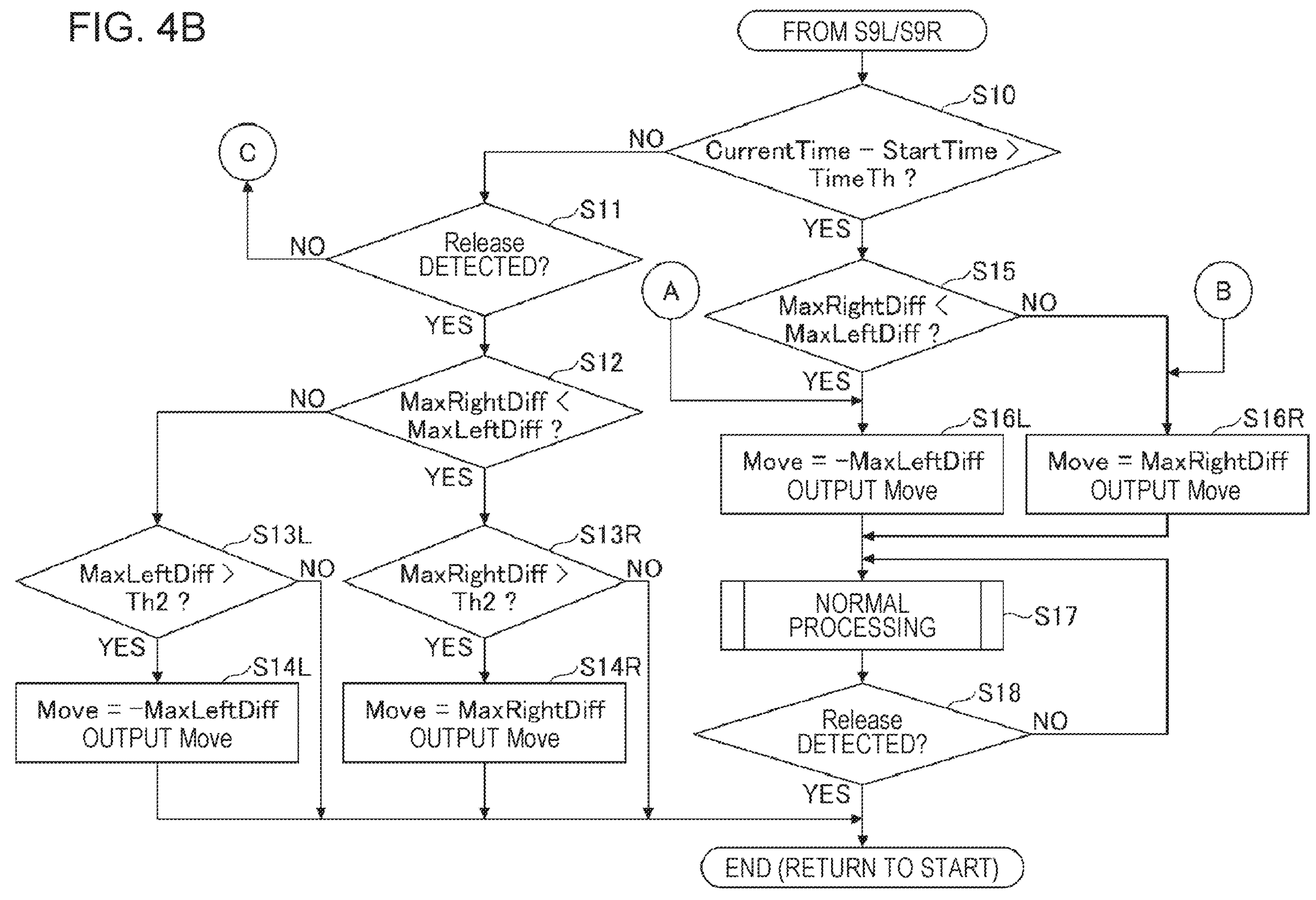
FIG. 4B
FROM S9L/S9R
S10
CurrentTime − StartTime > TimeTh ?
NO
YES
S11
Release DETECTED?
NO
C
YES
S12
MaxRightDiff < MaxLeftDiff ?
NO
YES
S13L
MaxLeftDiff > Th2 ?
NO
YES
S14L
Move = −MaxLeftDiff OUTPUT Move
S13R
MaxRightDiff > Th2 ?
NO
YES
S14R
Move = MaxRightDiff OUTPUT Move
A
S15
MaxRightDiff < MaxLeftDiff ?
NO
B
YES
S16L
Move = −MaxLeftDiff OUTPUT Move
S16R
Move = MaxRightDiff OUTPUT Move
NORMAL PROCESSING
S17
S18
Release DETECTED?
NO
YES
END (RETURN TO START)

100M
130
131
132
CONTROL UNIT
MEMORY
125A
125B
MEASUREMENT CIRCUIT
IMAGE DISPLAY CIRCUIT
120M
121
110
X
Y
Z

ELECTROSTATIC INPUT DEVICE

CLAIM OF PRIORITY

This application claims benefit of Japanese Patent Application No. 2024-051519 filed on Mar. 27, 2024, which is hereby incorporated by reference.

BACKGROUND OF THE INVENTION

1. Field of the Invention

The present disclosure relates to an electrostatic input device.

2. Description of the Related Art

A known input device for electronic devices includes an electrostatic touch sensor and is capable of receiving an input to an operation surface via a sliding operation. Such an input device determines an amount and direction of the sliding operation and outputs operation information including the operation direction and the operation amount to an electronic device (see Japanese Unexamined Patent Application Publication No. 2012-185538, for example).

When the user repeats a sliding operation in a certain direction (hereinafter, referred to as one direction) to the known input device (electrostatic input device), if the user releases the operation body such as a fingertip, hand, or the like from the operation surface and returns the operation body in a direction opposite to the one direction, the capacitance of an operation body, such as a fingertip, hand, or the like may be detected. In such a case, the amount of movement in the opposite direction may be output and the sliding operation may not be performed appropriately.

SUMMARY OF THE INVENTION

In view of the above, the present disclosure provides an electrostatic input device that enables users to appropriately perform a repeated sliding operation in one direction.

An electrostatic input device according to an aspect of the disclosure includes a plurality of electrostatic sensor electrodes arrayed in one direction, a measurement circuit configured to measure a capacitance between each of the plurality of electrostatic sensor electrodes and an operation body, a storage unit, and a control unit configured to calculate a position of the operation body based on a capacitance correction value obtained by subtracting a reference value from the capacitance measured by the measurement circuit, determine whether the operation body is close to at least one of the plurality of electrostatic sensor electrodes based on the capacitance correction value, and calculate a direction of movement and an amount of movement of the operation body. The control unit, when a state in which the operation body is not close to the plurality of electrostatic sensor electrodes changes to a state in which the operation body is close to at least one of the plurality of electrostatic sensor electrodes, stores the position of the electrostatic sensor electrode close to the operation body in the storage unit as a start position of the operation body, calculates a direction of movement and an amount of movement of the operation body based on a difference between the position of the operation body calculated based on the capacitance correction value and the start position, and outputs the direction of movement in which the amount of movement is maximized as the direction of movement of the operation body.

BRIEF DESCRIPTION OF THE DRAWINGS

FIG. 4B is a flowchart illustrating an example of processing to be performed by a control unit of an electrostatic input device according to an embodiment;

DESCRIPTION OF THE PREFERRED EMBODIMENTS

Hereinafter, embodiments of an electrostatic input device according to the disclosure will be described.

In the following description, an XYZ coordinate system is defined and described. A direction (X direction) parallel to the X axis, a direction (Y direction) parallel to the Y axis, and a direction (Z direction) parallel to the Z axis are mutually orthogonal. A phrase "in plan view" refers to viewing the XY plane. In the description below, for easy understanding of the structure, the length, width, thickness, and the like of each component may be exaggerated.

EMBODIMENT

Figure 1:
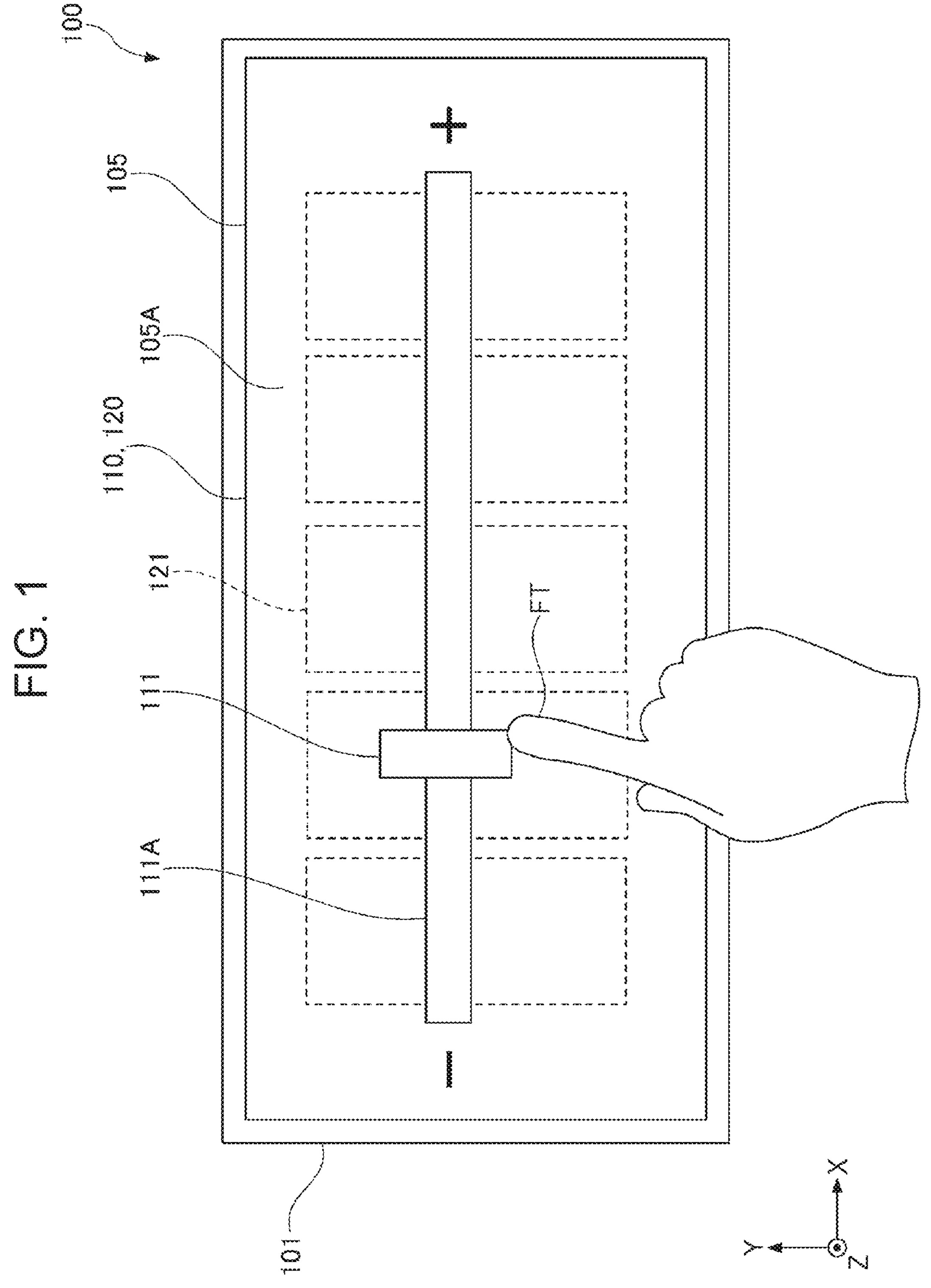
FIG. 1 illustrates an example structure of an electrostatic input device according to an embodiment.
Figure 2:
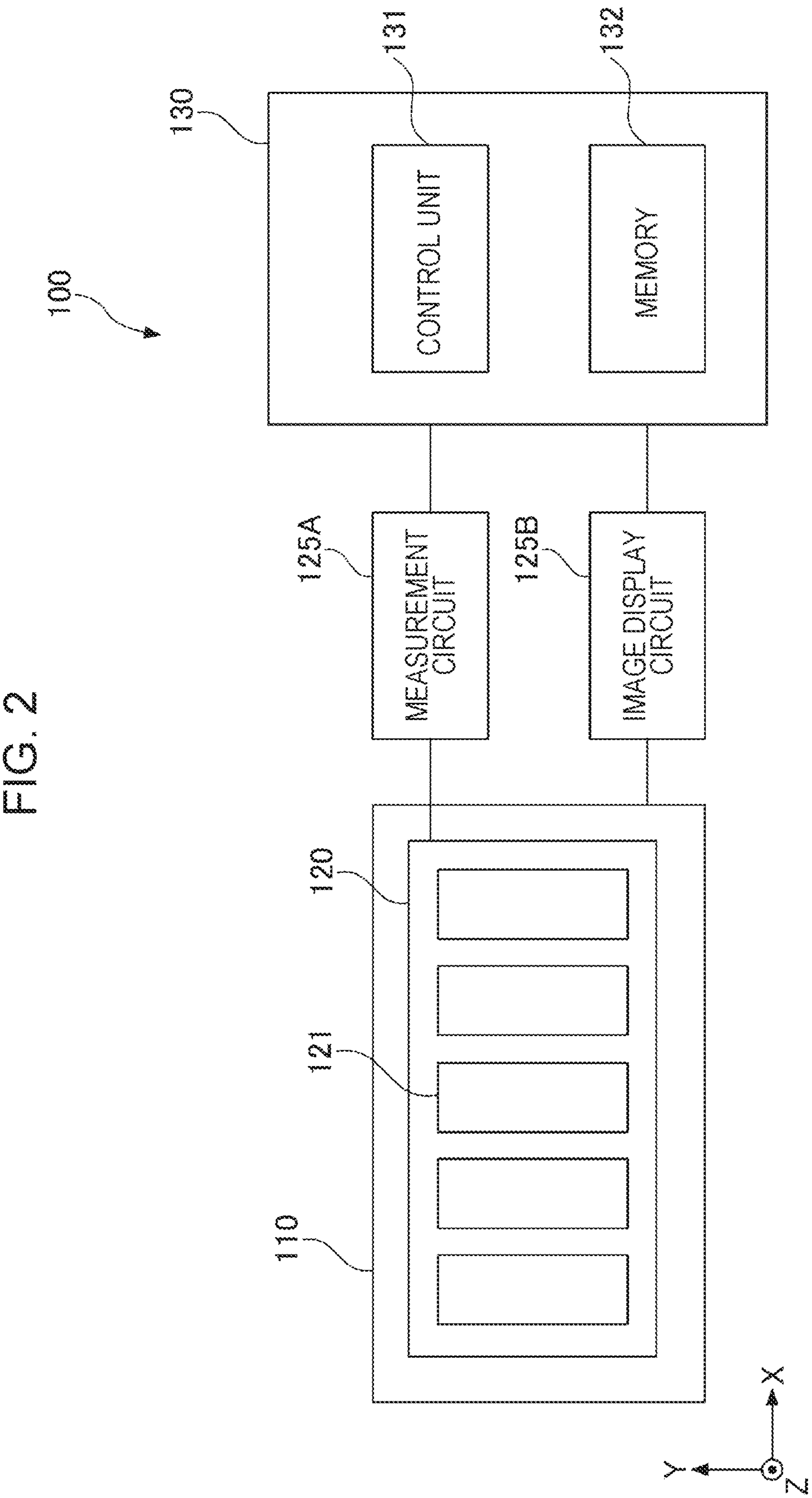
FIG. 2 illustrates an example structure of an electrostatic input device according to an embodiment.

FIG. 1 and FIG. 2 illustrate an example structure of an electrostatic input device 100 according to the embodiment.

The electrostatic input device 100 is provided, for example, in a center console of a vehicle, and is an input unit for adjusting the volume of an audio device or the like, or the temperature, the quantity of air, or the like of an air conditioner. For example, the volume, temperature, or quantity of air may be adjusted by operating a slider 111, which is a graphical user interface (GUI) switch. The electrostatic input device 100 may be a tablet-type input device or an input unit of an automatic teller machine (ATM) that is placed in a store or a facility, which are used by the general public. Alternatively, the electrostatic input device 100 may be a tablet computer, a smart phone, a game machine, or the like that is used individually.

In the following description, as an example, the slider 111 is operated by a fingertip FT of a hand of the user; however, the electrostatic input device 100 may be operated by using a portion of the body of the user other than the fingertip FT. The fingertip FT of the hand of the user is an example operation body.

In the following description, as an example, the slider 111 serves as an operation section for operating the volume of audio and the user operates the slider 111 to adjust the volume. Operating the slider 111 is referred to as a sliding operation. In FIG. 1, five electrostatic sensor electrodes 121 are provided. By moving the finger, the volume can be controlled in four levels. A volume that can be controlled in 16 levels from a minimum value to a maximum value requires four or more operations to adjust it from the minimum to the maximum (or from the maximum to the minimum).

To lower the volume, the user may operate the slider 111 from an end on the +X direction side to an end on the −X direction side while touching an operation surface 105A with the fingertip FT, then, the user may release the fingertip FT from the operation surface 105A and return the fingertip FT to the end on the +X direction side, and may repeat the operation of moving the slider 111 in the −X direction while touching the operation surface 105A with the fingertip FT again.

When the user returns the fingertip FT to the +X direction side while repeatedly operating the slider 111 in the −X direction (one direction), if the capacitance of an operation body, such as the fingertip, hand, or the like, is detected, the amount of operation in the +X direction may be output. In such a case, the sliding operation may not be appropriately performed.

The electrostatic input device 100 is configured such that while the user repeats the sliding operation in one direction in this way, such a detection of the amount of movement of the fingertip FT in the opposite direction is suppressed from occurring, thereby enabling the user to readily perform the sliding operation in the intended direction.

Overall Structure of Electrostatic Input Device 100

The electrostatic input device 100 includes a housing 101, a top panel 105, a display 110, an electrostatic sensor 120, a measurement circuit 125A, an image display circuit 125B, and a control device 130.

In FIG. 1, on the rear side (−Z direction side) of the top panel 105, the electrostatic sensor 120 is disposed, and on the rear side (−Z direction side) of the electrostatic sensor 120, the display 110 is disposed. Although the measurement circuit 125A, the image display circuit 125B, and the control device 130 (see FIG. 2) are omitted in FIG. 1, for example, the measurement circuit 125A, the image display circuit 125B, and the control device 130 are disposed on the rear side (−Z direction side) of the display 110 in the housing 101.

In FIG. 2, the housing 101 and the top panel 105 are omitted, and the display 110 is illustrated to be larger than the electrostatic sensor 120. In addition, in FIG. 2, the slider 111 to be displayed on the display 110 is omitted, and electrostatic sensor electrodes 121 in the electrostatic sensor 120 are illustrated transparently. In FIG. 2, the display 110 and the electrostatic sensor 120 are illustrated in the XYZ coordinates.

It should be noted that the electrostatic input device 100 does not necessarily include the display 110. In such a case, for example, in the electrostatic input device 100, a plurality of marks or the like may be provided in one direction on the top panel 105 by printing or other methods and a sliding operation may be performed along the marks.

Housing 101 and Top Panel 105 and Capacitance (Measured Value) of Measurement Circuit 125*a*

The housing 101 is a case made of resin, metal, or the like and is used to accommodate the display 110, the electrostatic sensor 120, the measurement circuit 125A, the image display circuit 125B, and the control device 130. The display 110, for example, is disposed below the transparent electrostatic sensor 120 and is visible through the operation surface 105A, which is a top surface of the transparent top panel 105 that is disposed in an opening portion provided at a top portion of the housing 101. The operation surface 105A is an example of a sensor surface. The electrostatic input device 100 can be operated in a state in which an operation body such as a hand of the user is in contact with the operation surface 105A.

The measurement circuit 125A measures the capacitance of an operation body such as a hand of the user. The measurement circuit 125A outputs the capacitance (measured value).

In the description below, "close" refers to a state in which an operation body such as a hand of the user is close to the electrostatic sensor 120. In a state in which a hand is in connection with the operation surface 105A, the operation body is close to the electrostatic sensor 120. Depending on the sensitivity of the electrostatic input device 100 and the thickness of the top panel 105, the capacitance may be measured even when the operation body is slightly away from the operation surface 105A.

Display 110

The display 110, for example, is a liquid crystal display, an organic electro luminescence (EL) display, or the like. The display 110 is a display unit for implementing a graphic user interface (GUI). The display 110 displays GUI images of the slider 111 and a frame 111A. The frame 111A indicates a range in which the slider 111 can be moved. It should be noted that the display 110 may display GUI buttons, a cursor, or the like other than the slider 111.

Electrostatic Sensor 120, Measurement Circuit 125A, Image Display Circuit 125B The electrostatic sensor 120 is stacked on the display 110 and includes a plurality of electrostatic sensor electrodes 121 arrayed in the X direction as illustrated in FIG. 2. Each electrostatic sensor electrode 121 extends in the Y direction. To the electrostatic sensor 120, the measurement circuit 125A is connected. To the display 110, the image display circuit 125B is connected. The measurement circuit 125A is disposed between the electrostatic sensor 120 and the control device 130. The image display circuit 125B is disposed between the display 110 and the control device 130.

The electrostatic sensor electrodes 121 are connected to the control device 130 via the measurement circuit 125A. Such an electrostatic sensor 120 may be an electrostatic sensor that is made by forming a transparent conductive film such as an indium tin oxide (ITO) film on the surface of a transparent glass substrate and by patterning the film as the electrostatic sensor electrodes 121. The capacitance of the electrostatic sensor 120 is input to the measurement circuit 125A. FIG. 1 and FIG. 2 illustrate five electrostatic sensor electrodes 121 as an example. As illustrated in FIG. 1, the five electrostatic sensor electrodes 121 are disposed at positions that overlap the slider 111 and the frame 111A.

The measurement circuit 125A is mounted on a wiring board. The measurement circuit 125A is disposed between the electrostatic sensor 120 and the control device 130, and performs analog-to-digital conversion (AD conversion) of the capacitance of each electrostatic sensor electrode 121. The measurement circuit 125A calculates a capacitance correction value ΔAD between the capacitance (measured value) of each electrostatic sensor electrode 121 and a reference value and outputs the calculated value to the control device 130.

The measurement circuit 125A scans each of the plurality of electrostatic sensor electrodes 121 one by one and converts the capacitance of each electrostatic sensor electrode 121 into a digital value. The measurement circuit 125A calculates the capacitance correction value ΔAD for each electrostatic sensor electrode 121 by subtracting the reference value from the digital value of the capacitance. The capacitance correction value ΔAD is a count value that is not converted into a capacitance (farad (F) unit). The reference value is a value that is proportional to the capacitance of an electrostatic sensor electrode 121 when there is no object body such as a fingertip FT around the electrostatic sensor electrode 121. The measurement circuit 125A calculates the capacitance correction value ΔAD by subtracting the reference value from the measured value of the capacitance of each electrostatic sensor electrode 121.

The image display circuit 125B is disposed between the display 110 and the control device 130, and displays GUI images of the slider 111 and the frame 111A on the display 110 in accordance with image data that is sent from the control device 130.

Control Device 130

The control device 130 includes a control unit 131 and memory 132. The control device 130 is implemented by a computer including a central processing unit (CPU), random access memory (RAM), read-only memory (ROM), an input-output interface, an internal bus, and the like. The control unit 131 represents a function of a program to be performed by the control device 130 as a function block. The memory 132 represents a function of the memory of the control device 130, and is an example of a storage unit.

Control Unit 131

The control unit 131 controls operations of the electrostatic input device 100. The control unit 131 receives a capacitance correction value ΔAD from the measurement circuit 125A and calculates an X coordinate of the fingertip FT. The control unit 131 controls the display of images on the display 110 that is performed via the image display circuit 125B. The control unit 131 outputs an amount of operation of the slider 111 operated by the fingertip FT to an electronic control unit (ECU) that controls audio, air conditioning, or the like in a vehicle.

The electrostatic sensor 120 includes the plurality of electrostatic sensor electrodes 121, which are arrayed in the X direction, and thus the X coordinate of the fingertip FT calculated by the control unit 131 corresponds to any one of the X coordinates of the plurality of electrostatic sensor electrodes 121. The X coordinate of the electrostatic sensor electrode 121 is, for example, the X coordinate of a center of the electrostatic sensor electrode 121.

Memory 132

The memory 132 stores a reference value that is used when the measurement circuit 125A calculates a capacitance correction value ΔAD. As described above, the reference value is a value that is proportional to the capacitance of an electrostatic sensor electrode 121 when there is no object body such as the fingertip FT around the electrostatic sensor electrode 121.

Sliding Operation on Electrostatic Input Device 100

FIG. 3A to FIG. 3F illustrate an example sliding operation on the electrostatic input device 100. Here, problems that may arise when processing unique to the electrostatic input device 100 is not applied will also be described.

FIG. 3A to FIG. 3F illustrate the housing 101, the operation surface 105A, the five electrostatic sensor electrodes 121, and the fingertip FT in the XZ cross-section. Although the slider 111 is not illustrated in FIG. 3A to FIG. 3F, the description will be made on an assumption that the slider 111 is being displayed through the operation surface 105A as illustrated in FIG. 1.

Figure 3A:
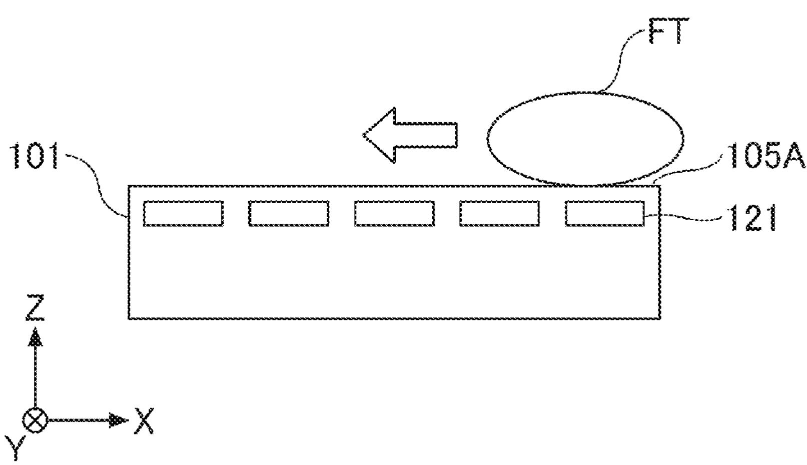
FIG. 3A illustrates an example sliding operation on an electrostatic input device according to an embodiment.
Figure 3B:
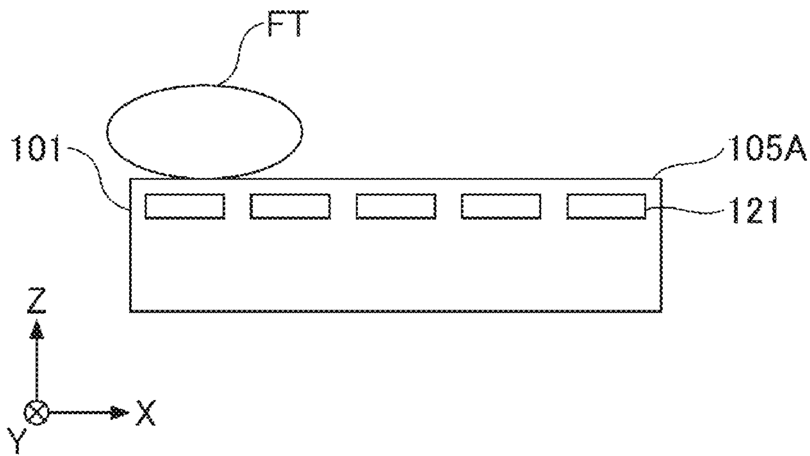
FIG. 3B illustrates an example sliding operation on an electrostatic input device according to an embodiment.

In FIG. 3A, the user is touching an end of the operation surface 105A on the +X direction side with the fingertip FT. The user is performing a sliding operation in the −X direction as indicated by the arrow to lower the volume, and in FIG. 3B, the fingertip FT is touching an end of the operation surface 105A on the −X direction side.

Figure 3C:
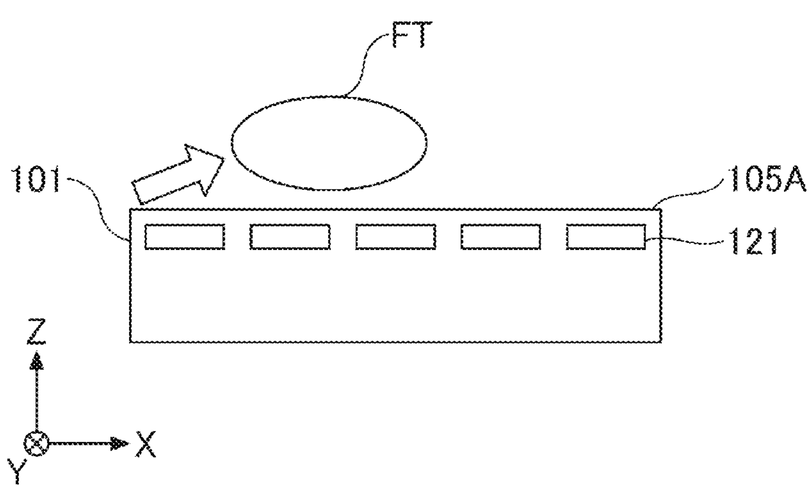
FIG. 3C illustrates an example sliding operation on an electrostatic input device according to an embodiment.

When the user repeats such a sliding operation, before performing the next sliding operation, the user releases the fingertip FT from the operation surface 105A as illustrated in FIG. 3C; however, immediately after finishing the sliding operation, the fingertip FT is not sufficiently separated from the operation surface 105A, and the capacitance of the fingertip FT may be measured by the measurement circuit 125A.

Figure 3D:
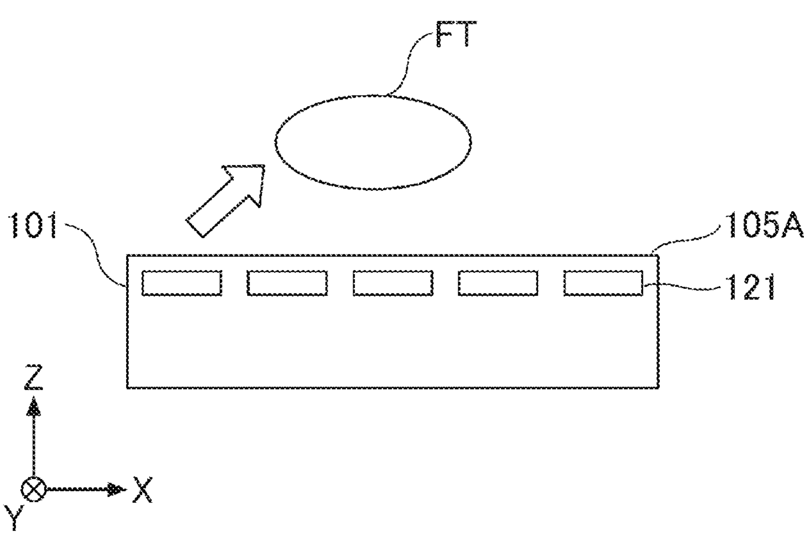
FIG. 3D illustrates an example sliding operation on an electrostatic input device according to an embodiment.

When the user further moves the fingertip FT and the fingertip FT is sufficiently separated from the operation surface 105A as illustrated in FIG. 3D, the capacitance of the fingertip FT is not measured by the measurement circuit 125A.

Figure 3E:
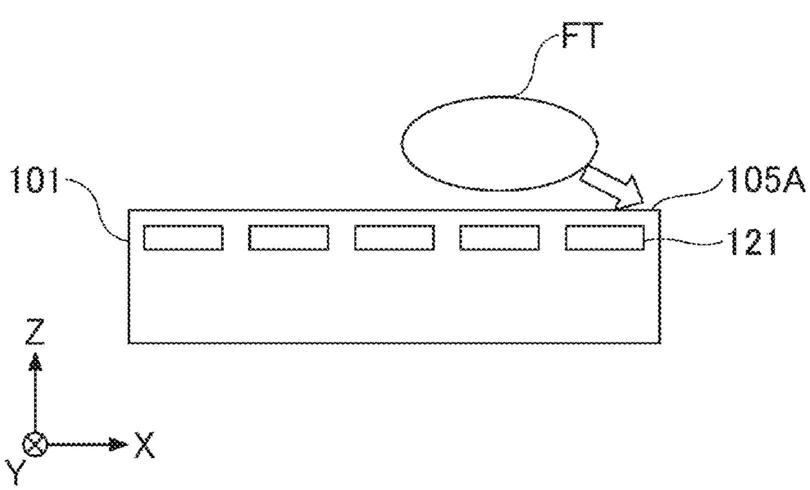
FIG. 3E illustrates an example sliding operation on an electrostatic input device according to an embodiment.
Figure 3F:
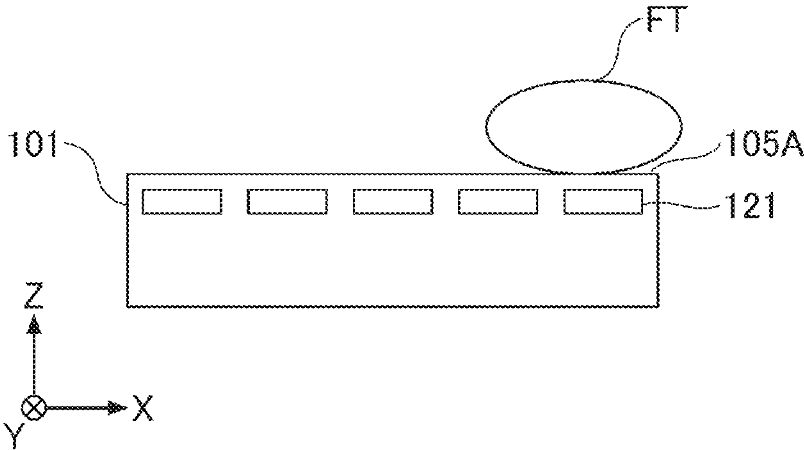
FIG. 3F illustrates an example sliding operation on an electrostatic input device according to an embodiment.

As illustrated in FIG. 3E, when the user moves the fingertip FT close to the end of the operation surface 105A on the +X direction side, the capacitance of the fingertip FT may be measured by the measurement circuit 125A at a position before the end on the +X direction side. In FIG. 3F, the fingertip FT is touching the end of the operation surface 105A on the +X direction side for the next sliding operation. In this state, the capacitance of the fingertip FT is measured by the measurement circuit 125A.

As described above, in repeating the sliding operation, when the fingertip FT is returned to the +X direction side as illustrated in FIG. 3C, the capacitance in moving the fingertip FT in the +X direction may be measured by the measurement circuit 125A contrary to the user's intention to repeatedly operate the slider 111 in the −X direction. In another case, as illustrated in FIG. 3E, the capacitance in moving the fingertip FT in the +X direction may be measured by the measurement circuit 125A at a position before the end on the +X direction side.

As described above, in such a case in which the capacitance is measured when the fingertip FT is being moved in the direction opposite to the user's intended moving direction, if the processing unique to the electrostatic input device 100 is not performed, the volume may increase even though the user is operating the electrostatic input device 100 to lower the volume.

The electrostatic input device 100 can suppress such an operation that is contrary to the user's intention from occurring, enabling the user to appropriately repeat the sliding operation in one direction. Specific processing will be described with reference to FIG. 4A to FIG. 4C.

Flowchart

Figure 4A:
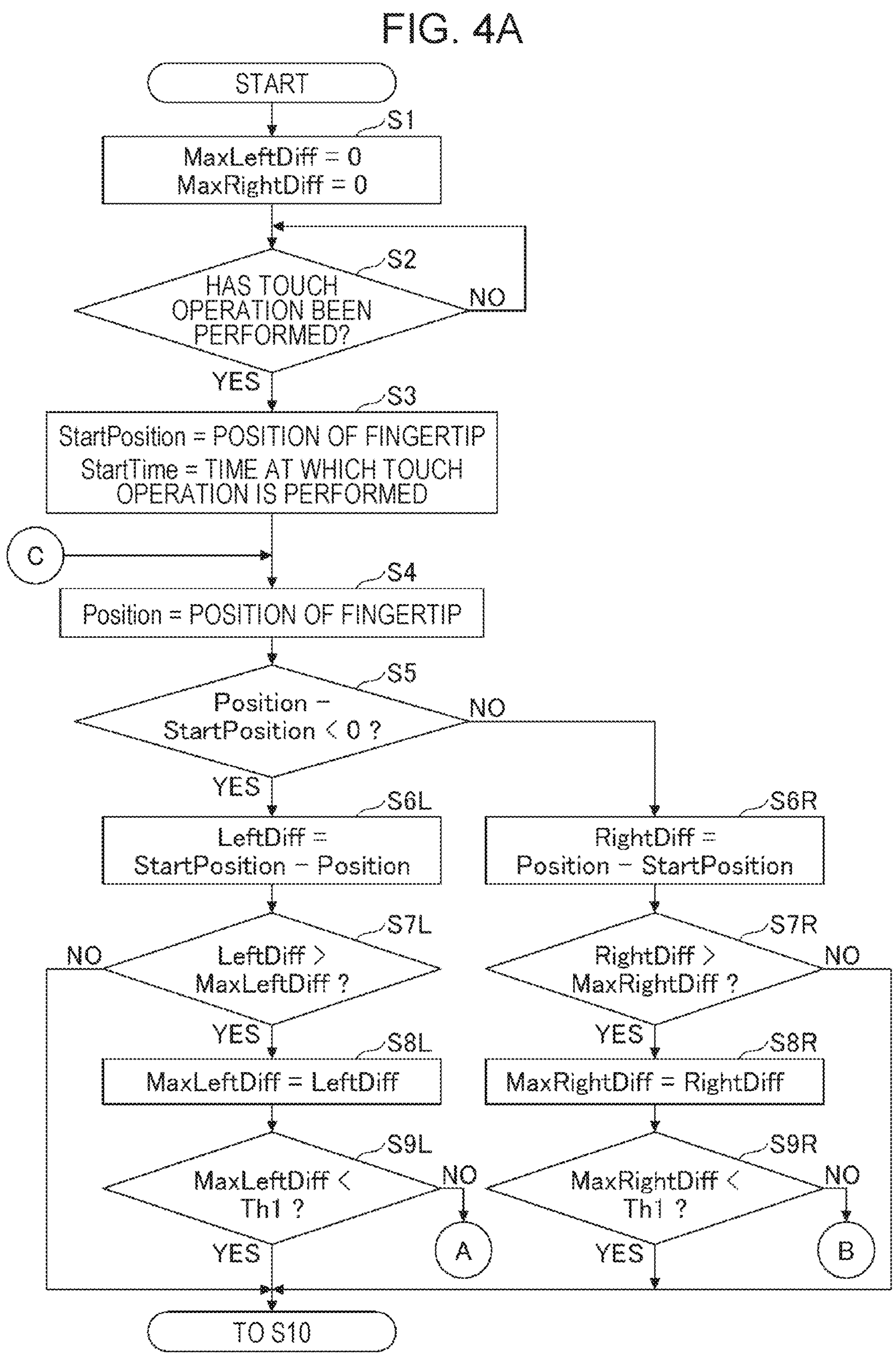
FIG. 4A is a flowchart illustrating an example of processing to be performed by a control unit of an electrostatic input device according to an embodiment.
Figure 4C:
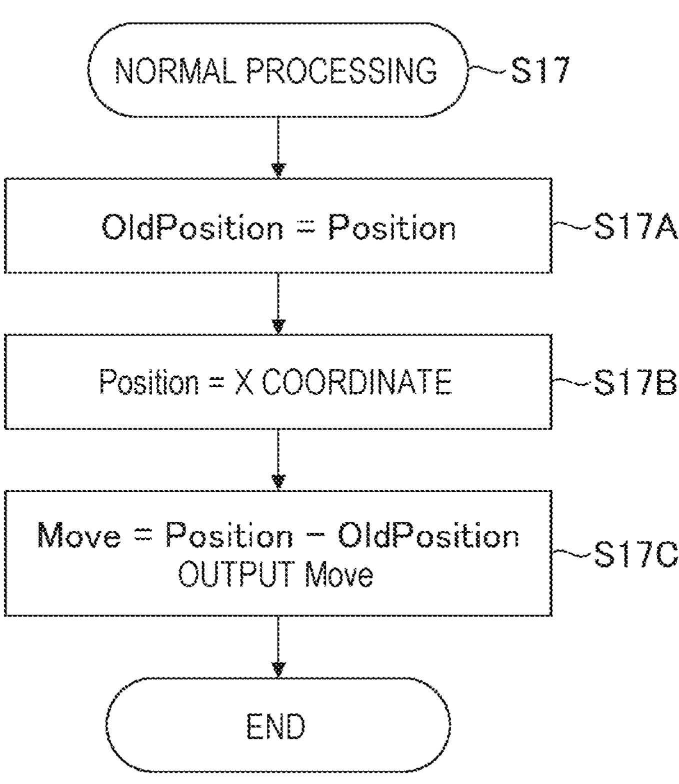
FIG. 4C is a flowchart illustrating an example of processing to be performed by a control unit of an electrostatic input device according to an embodiment.

FIG. 4A to FIG. 4C are flowcharts illustrating an example of processing to be performed by the control unit 131 in the electrostatic input device 100. The control unit 131 performs, as an example, the following processing based on X coordinates that are input from the measurement circuit 125A.

Among X coordinates of the fingertip FT, the X coordinate is 1 at a position that corresponds to an electrostatic sensor electrode 121 that is located at a position furthest on the −x direction side among the five electrostatic sensor electrodes 121, and the X coordinate increases by 1 as it goes in the +X direction, and the X coordinate is 5 at a position that corresponds to an electrostatic sensor electrode 121 that is located at a position furthest on the +X side. More specifically, the X coordinate values of the fingertip FT corresponding to the electrostatic sensor electrodes 121 on the +X direction side are greater than the X coordinate values of the fingertip FT corresponding to the electrostatic sensor electrodes 121 on the −X direction side, and all values are expressed as positive values.

The control unit 131 initializes a maximum left movement amount MaxLeftDiff of the X coordinates and a maximum right movement amount MaxRightDiff of the X coordinate (step S1). More specifically, the processing of MaxLeftDiff=0 and the processing of MaxRightDiff=0 are performed. Each time an X coordinate is input from the measurement circuit 125A, the control unit 131 calculates an amount of movement in the left direction from a start position, and a maximum left movement amount MaxLeftDiff of the X coordinates is a maximum amount of movement in the left direction that the control unit 131 has calculated. Similarly, a maximum right movement amount MaxRightDiff of the X coordinates is a maximum amount of movement in the right direction that the control unit 131 has calculated.

The control unit 131 compares a capacitance correction value ΔAD with a threshold value for touch detection to determine whether a touch operation has been performed by the fingertip FT on the operation surface 105A (step S2). The control unit 131 determines that a touch operation has been detected when the capacitance correction value ΔAD exceeds the threshold value for touch detection.

When the control unit 131 determines that a touch operation has been performed (S2: Yes), the control unit 131 stores the X coordinate of the fingertip FT at the time the touch operation is performed in the memory 132 as a start position StartPosition and also stores the time at which the touch operation is performed as StartTime in the memory 132 (step S3).

When the control unit 131 determines that a touch operation has not been performed in step S2 (S2: No), the control unit 131 repeats the processing in step S2.

The control unit 131 calculates the current position (X coordinate) of the fingertip based on the capacitance correction value ΔAD input from the measurement circuit 125A, and stores the current position in the memory 132 as a current fingertip FT's position (step S4). More specifically, the processing of Position=the position of the fingertip is performed.

The control unit 131 determines whether the value obtained by subtracting the start position StartPosition from the fingertip FT's position Position is less than 0 (step S5). More specifically, whether Position−StartPosition<0 is satisfied is determined. When the calculated value is less than 0, it means that the direction of the sliding operation is left, and when the calculated value is greater than 0, it means that the direction of the sliding operation is right. When the calculated value is 0, it means a stationary state. In this flowchart, for convenience, the same processing is performed in the case of the stationary state as in the case of the right-direction operation.

When the control unit 131 determines that the calculated value is less than 0 (S5: Yes), the flow proceeds to step S6L, and when the control unit 131 determines that the calculated value is not less than 0 (S5: No), the flow proceeds to step S6R.

When the control unit 131 determines that the calculated value is less than 0 (S5: Yes), the control unit 131 calculates a left movement amount LeftDiff as a value obtained by subtracting the fingertip FT's position Position from the start position StartPosition (step S6L). More specifically, the processing of LeftDiff=StartPosition-Position is performed. The control unit 131 determines whether the left movement amount LeftDiff is greater than a maximum left movement amount MaxLeftDiff (step S7L). More specifically, whether LeftDiff>MaxLeftDiff is determined.

When the control unit 131 determines that the left movement amount LeftDiff is greater than a maximum left movement amount MaxLeftDiff (S7L: Yes), the control unit 131 updates the maximum left movement amount MaxLeftDiff with the left movement amount LeftDiff (step S8L). More specifically, the processing of MaxLeftDiff=LeftDiff is performed. The maximum left movement amount MaxLeftDiff is an example of a first maximum value.

The control unit 131 determines whether the left movement amount LeftDiff is less than a first threshold value Th1 (step S9L). More specifically, whether MaxLeftDiff<Th1 is satisfied is determined. The first threshold value Th1 is a threshold value that is used to determine whether an amount of movement of a sliding operation is very large.

When the control unit 131 determines that the left movement amount LeftDiff is not less than the first threshold value Th1 (S9L: No), the flow proceeds to step S16L. When the left movement amount LeftDiff is greater than the first threshold value Th1, the amount of movement of the sliding operation in the left direction is very large, and the control unit 131 outputs a movement amount Move of the sliding operation in the left direction in step S16L. The movement amount Move represents the direction of movement in addition to the amount of movement of the fingertip FT. When the sign of the movement amount Move is negative, the direction of movement is left and when the sign of the movement amount Move is positive, the direction of movement is right. The processing in step S16L is described below.

In step S9L, when the control unit 131 determines that the left movement amount LeftDiff is less than a first threshold value Th1 (S9L: Yes), the flow proceeds to step S10.

In step S7L, when the control unit 131 determines that the left movement amount LeftDiff is not greater than a maximum left movement amount MaxLeftDiff (S7L: No), the flow proceeds to step S10. This is because the maximum left movement amount MaxLeftDiff is not updated.

In step S5, when the control unit 131 determines that the calculated value is not less than 0 (S5: No), the control unit 131 calculates a right movement amount RightDiff as a value obtained by subtracting the start position StartPosition from the fingertip FT's position Position (step S6R). More specifically, the processing of RightDiff=Position−StartPosition is performed. The right movement amount RightDiff represents that the position is moved to the right compared to the start position Startposition and thus the right movement amount RightDiff is a value obtained by subtracting the start position StartPosition from the fingertip FT's position Position.

The control unit 131 determines whether the right movement amount RightDiff is greater than a maximum right movement amount MaxRightDiff (step S7R). More specifically, whether RightDiff>MaxRightDiff is determined.

When the control unit 131 determines that the right movement amount RightDiff is greater than a maximum right movement amount MaxRightDiff (S7R: Yes), the control unit 131 updates the maximum right movement amount MaxRightDiff with the right movement amount RightDiff (step S8R). More specifically, the processing of MaxRightDiff=RightDiff is performed. The maximum right movement amount MaxRightDiff is an example of a second maximum value.

The control unit 131 determines whether the right movement amount RightDiff is less than the first threshold value Th1 (step S9R). More specifically, whether MaxRightDiff<Th1 is satisfied is determined. The first threshold value Th1 is a threshold value that is used to determine whether an amount of movement of a sliding operation is very large, and is the same as the first threshold value Th1 in step S9L.

When the control unit 131 determines that the right movement amount RightDiff is not less than the first threshold value Th1 (S9R: No), the flow proceeds to step S16R. When the right movement amount RightDiff is greater than the first threshold value Th1, the amount of movement of the sliding operation in the right direction is very large, and the control unit 131 outputs a movement amount Move of the sliding operation in the right direction in step S16R. The movement amount Move represents the direction of movement in addition to the amount of movement of the fingertip FT. When the sign of a movement amount Move is negative, the direction of movement is left and when the sign of a movement amount Move is positive, the direction of movement is right. The processing in step S16R is described below.

In step S9R, when the control unit 131 determines that the right movement amount RightDiff is less than the first threshold value Th1 (S9R: Yes), the flow proceeds to step S10.

In step S7R, when the control unit 131 determines that the right movement amount RightDiff is not greater than the maximum right movement amount MaxRightDiff (S7R: No), the flow proceeds to step S10. This is because the maximum right movement amount MaxRightDiff is not updated.

In step S10, the control unit 131 determines whether a time obtained by subtracting the time startTime at which the touch operation is performed from the current time CurrentTime is longer than a predetermined time TimeTh (step S10). More specifically, whether CurrentTime−StartTime>TimeTh is satisfied is determined.

When the control unit 131 determines that a time obtained by subtracting the time startTime at which the touch operation is performed from the current time CurrentTime is not longer than a predetermined time TimeTh (S10: No), the control unit 131 determines whether the fingertip FT has been released from the operation surface 105A (step S11).

When the control unit 131 determines that the fingertip FT has been released from the operation surface 105A (S11: Yes), the control unit 131 determines whether the maximum left movement amount MaxLeftDiff is greater than the maximum right movement amount MaxRightDiff (step S12). More specifically, whether MaxRightDiff<MaxLeftDiff is satisfied is determined.

When the control unit 131 determines that the maximum left movement amount MaxLeftDiff is greater than the maximum right movement amount MaxRightDiff (S12: Yes), the control unit 131 determines whether the maximum left movement amount MaxLeftDiff is greater than a second threshold value Th2 (step S13L). More specifically, whether MaxLeftDiff>Th2 is satisfied is determined. The second threshold value Th2 is a threshold value that represents an amount of movement less than the first threshold value Th1, and is used to determine whether a fingertip FT is moved in a sliding operation. The second threshold value Th2 is less than the first threshold value Th1.

When the control unit 131 determines that the maximum left movement amount MaxLeftDiff is greater than a second threshold value Th2 (S13L: Yes), the control unit 131 outputs a value obtained by giving the negative sign to the maximum left movement amount MaxLeftDiff as a movement amount Move of the sliding operation (step S14L). More specifically, −MaxLeftDiff is assigned to the movement amount Move and then the movement amount Move is output. The movement amount Move represents the direction of movement in addition to the amount of movement of the fingertip FT. When the sign of the movement amount Move is negative, the direction of movement is left and when the sign of the movement amount Move is positive, the direction of movement is right. The flow returns to the start in response to the control unit 131 completing the processing in step S14L. This processing is performed to perform a next process of calculating a movement amount Move.

By outputting the movement amount Move represented by −MaxLeftDiff, even if a movement amount in the direction opposite to the moving direction of the fingertip FT intended by the user is calculated in step S6L, the movement amount in the opposite direction is excluded from the calculation of the moving direction represented by the movement amount Move. Accordingly, the moving direction of the fingertip FT intended by the user can be correctly calculated.

In step S13L, when the control unit 131 determines that the maximum left movement amount MaxLeftDiff is not greater than a second threshold value Th2 (S13L: No), the flow returns to the start. The amount of movement of the sliding operation to the left is small and thus this processing is performed to perform a next process of calculating a movement amount Move without outputting a movement amount Move.

In step S12, when the control unit 131 determines that the maximum left movement amount MaxLeftDiff is not greater than the maximum right movement amount MaxRightDiff (S12: No), the control unit 131 determines whether the maximum right movement amount MaxRightDiff is greater than a second threshold value Th2 (step S13R). More specifically, whether MaxRightDiff>Th2 is satisfied is determined. The second threshold value Th2 is the same as the second threshold value Th2 in step S13L.

When the control unit 131 determines that the maximum right movement amount MaxRightDiff is greater than a second threshold value Th2 (step S13R: Yes), the control unit 131 outputs the maximum right movement amount MaxRightDiff as a movement amount Move of the sliding operation (step S14R). More specifically, MaxRightDiff is assigned to the movement amount Move and then the movement amount Move is output. The movement amount Move represents the direction of movement in addition to the amount of movement of the fingertip FT. When the sign of the movement amount Move is negative, the direction of movement is left and when the sign of the movement amount Move is positive, the direction of movement is right. The flow returns to the start in response to the control unit 131 completing the processing in step S14R. This processing is performed to perform a next process of calculating a movement amount Move. It should be noted that when the fingertip FT is released from the operation surface 105A without moving the fingertip FT on the operation surface 105A, both MaxLeftDiff and MaxRightDiff are 0. Accordingly, in step S14R, the value 0 that is assigned to the movement amount Move is output.

By outputting the movement amount Move represented by −MaxRightDiff, even if a movement amount in the direction opposite to the moving direction of the fingertip FT intended by the user is calculated in step S6R, the movement amount in the opposite direction is excluded from the calculation of the moving direction represented by the movement amount Move. Accordingly, the moving direction of the fingertip FT intended by the user can be correctly calculated.

In step S13R, when the control unit 131 determines that the maximum right movement amount MaxRightDiff is not greater than a second threshold value Th2 (S13R: No), the flow returns to the start. The amount of movement of the sliding operation to the right is small and thus this processing is performed to perform a next process of calculating a movement amount Move without outputting a movement amount Move.

In step S11, when the control unit 131 determines that the fingertip FT has not been released from the operation surface 105A (S11: No), the processing returns to step S4. This processing is performed to store the fingertip FT's position Position in the memory 132 because the sliding operation is being performed continuously.

In step S10, when the control unit 131 determines that a time obtained by subtracting the time startTime at which the touch operation is performed from the current time CurrentTime is longer than a predetermined time TimeTh (S10: Yes), the control unit 131 determines whether the maximum left movement amount MaxLeftDiff is greater than the maximum right movement amount MaxRightDiff (step S15). More specifically, whether MaxRightDiff<MaxLeftDiff is satisfied is determined.

When the control unit 131 determines that the maximum left movement amount MaxLeftDiff is greater than the maximum right movement amount MaxRightDiff (S15: Yes), the control unit 131 outputs a value obtained by giving the negative sign to the maximum left movement amount MaxLeftDiff as a movement amount Move (step S16L). More specifically, −MaxLeftDiff is assigned to Move and then the movement amount Move is output.

By outputting the movement amount Move represented by −MaxLeftDiff, even if a movement amount in the direction opposite to the moving direction of the fingertip FT intended by the user is calculated in step S6L, the movement amount in the opposite direction is excluded from the calculation of the moving direction represented by the movement amount Move. Accordingly, the moving direction of the fingertip FT intended by the user can be correctly calculated.

The control unit 131 performs normal processing (step S17). The normal processing is a process of outputting a direction of movement and an amount of movement of the fingertip FT based on a position of the fingertip FT calculated last time and a current position of the fingertip FT. The normal processing will be described with reference to FIG. 4C.

In step S15, when the control unit 131 determines that the maximum left movement amount MaxLeftDiff is not greater than the maximum right movement amount MaxRightDiff (S15: No), the control unit 131 outputs the maximum right movement amount MaxRightDiff as a movement amount Move of the sliding operation (step S16R). More specifically, MaxRightDiff is assigned to Move and then the movement amount Move is output. The flow proceeds to step S17 in response to the control unit 131 completing the processing in step S16R. It should be noted that when the time TimeTh elapses without moving the fingertip FT on the operation surface 105A, both MaxLeftDiff and MaxRightDiff are 0. Accordingly, in step S16R, the value 0 that is assigned to the movement amount Move is output.

By outputting the movement amount Move represented by −MaxRightDiff, even if a movement amount in the direction opposite to the moving direction of the fingertip FT intended by the user is calculated in step S6R, the movement amount in the opposite direction is excluded from the calculation of the moving direction represented by the movement amount Move. Accordingly, the moving direction of the fingertip FT intended by the user can be correctly calculated.

In response to the completion of the processing in step S17, the control unit 131 determines whether the fingertip FT has been released from the operation surface 105A (step S18).

When the control unit 131 determines that the fingertip FT has been released from the operation surface 105A (S18: Yes), the flow returns to the start.

When the control unit 131 determines that the fingertip FT has not been released from the operation surface 105A (S18: No), the flow returns to step S17. This processing is performed to perform the normal processing.

Normal Processing

The control unit 131 sets a fingertip FT's position OldPosition calculated last time to the current fingertip FT's position Position (step S17A). More specifically, the processing of OldPosition=Position is performed.

The control unit 131 calculates the current X coordinate of the fingertip FT and stores the current X coordinate in the memory 132 as a current fingertip FT's position Position (step S17B). More specifically, Position=X coordinate.

The control unit 131 outputs the movement amount Move of the fingertip FT (step S17C). The movement amount Move is obtained by subtracting the fingertip FT's position OldPosition calculated last time from the current fingertip FT's position Position. More specifically, the processing of Move=Position−OldPosition is performed. The control unit 131 outputs the calculated movement amount Move.

In the above description, the example of outputting a movement amount Move that represents an amount of movement and a direction of movement of the fingertip FT in steps S14L, S14R, S16L, and S16R has been described. However, the electrostatic input device 100 may be configured to output only an amount of movement in steps S14L, S14R, S16L, and S16R.

Advantageous Effects of Invention

The electrostatic input device 100 includes a plurality of electrostatic sensor electrodes 121 arrayed in one direction, the measurement circuit 125A configured to measure a capacitance between each of the plurality of electrostatic sensor electrodes 121 and an operation body, the memory 132, and the control unit 131 configured to calculate a position of the operation body based on a capacitance correction value obtained by subtracting a reference value from the capacitance measured by the measurement circuit 125A, determine whether the operation body is close to at least one of the plurality of electrostatic sensor electrodes 121 based on the capacitance correction value, and calculate a direction of movement and an amount of movement of the operation body. The control unit 131, when a state in which the operation body is not close to the plurality of electrostatic sensor electrodes 121 changes to a state in which the operation body is close to at least one of the plurality of electrostatic sensor electrodes 121, stores the position of the electrostatic sensor electrode 121 close to the operation body in the memory 132 as a start position of the operation body, calculates a direction of movement and an amount of movement of the operation body based on a difference between the position of the operation body calculated based on the capacitance correction value and the start position, and outputs the direction of movement in which the amount of movement is maximized as the direction of movement of the operation body. By outputting the direction of movement in which the amount of movement is maximized as the direction of movement of the operation body, when the user repeats the sliding operation, even if a movement amount in the direction opposite to the moving direction of the fingertip FT intended by the user is calculated, the movement amount in the opposite direction is excluded from the calculation of the moving direction, enabling the moving direction of the fingertip FT intended by the user to be calculated.

Accordingly, the electrostatic input device 100 that can appropriately process a sliding operation repeated in one direction can be provided.

The control unit 131 may output the amount of movement at which the amount of movement is maximized as the amount of movement of the operation body together with the direction of movement. This enables the appropriate calculation of the direction of movement and the amount of movement of the fingertip FT intended by the user.

The amount of movement may be the difference between the position of the operation body and the start position. The amount of movement can be reliably and accurately calculated based on the difference between the position of the operation body and the start position.

The control unit 131 may store a first maximum value (maximum left movement amount MaxLeftDiff) in the memory 132, which is a maximum value among a plurality of first amounts of movement that are a plurality of differences between the start position and a plurality of positions of the operation body obtained when the operation body is on a first side (left side) in the one direction with respect to the start position, store a second maximum value (maximum right movement amount MaxRightDiff) in the memory 132, which is a maximum value among a plurality of second amounts of movement that are a plurality of differences between the start position and a plurality of positions of the operation body obtained when the operation body is on a second side (right side) opposite to the first side in the one direction with respect to the start position, and output the direction of movement corresponding to a larger one of the first maximum value and the second maximum value as the direction of movement of the operation body (Steps S8L, S8R, S14L, S14R, S16L, S16R). By using a first maximum value (maximum left movement amount MaxLeftDiff) and a second maximum value (maximum right movement amount MaxRightDiff), even if a movement amount in the direction opposite to the moving direction of the fingertip FT intended by the user is calculated, the movement amount in the opposite direction is excluded from the calculation of the moving direction. By outputting the direction of movement corresponding to a larger one of the first maximum value and the second maximum value as the direction of movement of the operation body, the direction of movement of the fingertip FT intended by the user can be calculated correctly.

When a predetermined time (TimeTh) elapses after the state in which the operation body is not close to the plurality of electrostatic sensor electrodes 121 changes to the state in which the operation body is close to at least one of the plurality of electrostatic sensor electrodes 121, the control unit 131 may output the direction of movement corresponding to the larger one of the first maximum value and the second maximum value as the direction of movement of the operation body (from step S9L or S9R: Yes to S16L or S16R). By obtaining the first maximum value and the second maximum value until a predetermined time (TimeTh) elapses, whether the user is performing the sliding operation slowly or quickly, the direction of movement intended by the user can be output stably.

Before the predetermined time elapses after the state in which the operation body is not close to the plurality of electrostatic sensor electrodes 121 changes to the state in which the operation body is close to at least one of the plurality of electrostatic sensor electrodes 121, if one of the first maximum value and the second maximum value exceeds a first threshold value, the control unit 131 may output the direction of movement corresponding to the one of the first maximum value and the second maximum value that exceeds the first threshold value as the direction of movement of the operation body (from step S9L or S9R: No to S16L or S16R). When a sufficiently large first maximum value or second maximum value is obtained before the predetermined time (TimeTh) elapses, the user is quickly performing the sliding operation of a large amount of movement, and in such a case, by determining the direction of movement in an early stage, the quick operation can be followed, enabling the increased operability.

Before the predetermined time elapses, if the state changes to a state in which the operation body is not close to the plurality of electrostatic sensor electrodes 121, the control unit 131 outputs the direction of movement corresponding to one of the first maximum value and the second maximum value that exceeds a second threshold value as the direction of movement of the operation body (step S14L or S14R). When a relatively large first maximum value or second maximum value is obtained before the predetermined time (TimeTh) elapses, the user is quickly performing the sliding operation of a large amount of movement, and in such a case, by determining the direction of movement in an early stage, the quick operation can be followed, enabling the increased operability.

After the predetermined time elapses and the control unit 131 outputs the direction of movement corresponding to the larger one of the first maximum value and the second maximum value as the direction of movement of the operation body, the control unit 131 outputs a difference between the position of the operation body calculated based on the capacitance correction value and the position of the operation body calculated in a calculation cycle immediately before a calculation cycle in which the position of the operation body is calculated as the amount of movement of the operation body (step S17). After the direction of movement is determined, by outputting the amount of movement corresponding to the amount of movement of the fingertip FT, the amount of movement of the fingertip FT in the sliding operation can be output appropriately.

First Modification

Figure 5:
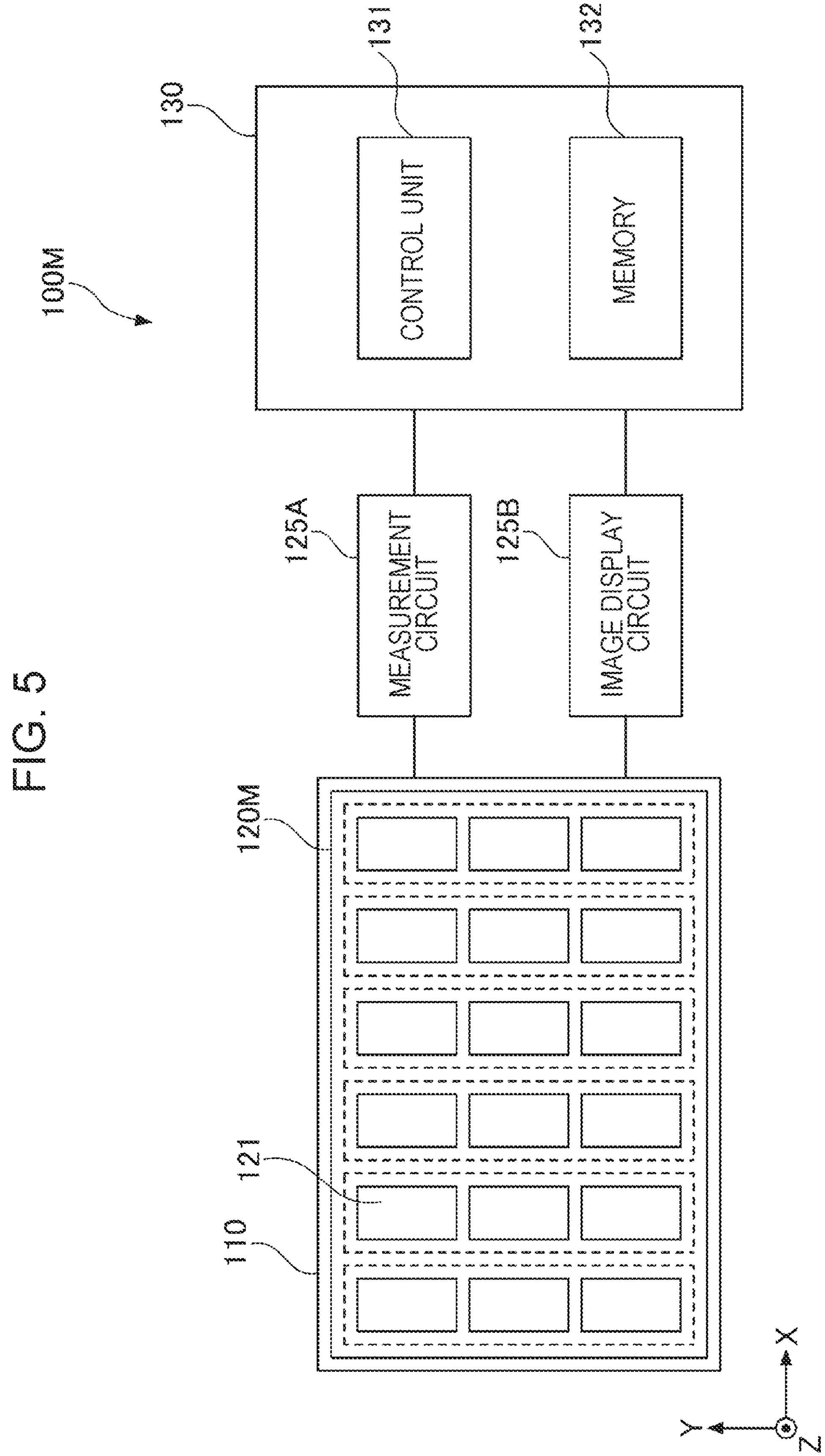
FIG. 5 illustrates an example structure of an electrostatic input device according to a modification of an embodiment.

FIG. 5 illustrates an example structure of an electrostatic input device 100M according to a modification of the embodiment. The electrostatic input device 100M includes an electrostatic sensor 120M instead of the electrostatic sensor 120 in the electrostatic input device 100 illustrated in FIG. 2. The electrostatic sensor 120M includes a plurality of electrostatic sensor electrodes 121 arrayed in the X direction and Y direction. The measurement circuit 125A sequentially selects the plurality of electrostatic sensor electrodes 121 and measures the capacitance of each electrostatic sensor electrode 121. The control unit 131 acquires an X coordinate and a Y coordinate that correspond to an electrostatic sensor electrode 121 that corresponds to a position of the fingertip FT among the plurality of electrostatic sensor electrode 121. The operation of the slider 111 can be detected by using such an electrostatic sensor 120M.

Although the electrostatic input device according to the exemplary embodiments of the disclosure has been described above, it is to be understood that the disclosure is not limited to these embodiments disclosed specifically, and various modifications or changes may be made without departing from the scope of the claims.

With respect to the above embodiments, the following appendixes are further disclosed.

Appendix 1

An electrostatic input device includes a plurality of electrostatic sensor electrodes arrayed in one direction, a measurement circuit configured to measure a capacitance between each of the plurality of electrostatic sensor electrodes and an operation body, a storage unit, and a control unit configured to calculate a position of the operation body based on a capacitance correction value obtained by subtracting a reference value from the capacitance measured by the measurement circuit, determine whether the operation body is close to at least one of the plurality of electrostatic sensor electrodes based on the capacitance correction value, and calculate a direction of movement and an amount of movement of the operation body, in which the control unit, when a state in which the operation body is not close to the plurality of electrostatic sensor electrodes changes to a state in which the operation body is close to at least one of the plurality of electrostatic sensor electrodes, stores the position of the electrostatic sensor electrode close to the operation body in the storage unit as a start position of the operation body, calculates a direction of movement and an amount of movement of the operation body based on a difference between the position of the operation body calculated based on the capacitance correction value and the start position, and outputs the direction of movement in which the amount of movement is maximized as the direction of movement of the operation body.

Appendix 2

The electrostatic input device according to appendix 1, in which the control unit outputs the amount of movement at which the amount of movement is maximized as the amount of movement of the operation body together with the direction of movement.

Appendix 3

The electrostatic input device according to appendix 1 or appendix 2, wherein the amount of movement is the difference between the position of the operation body and the start position.

Appendix 4

The electrostatic input device according to any one of appendix 1 to appendix 3, in which, the control unit stores a first maximum value in the storage unit, the first maximum value being a maximum value among a plurality of first amounts of movement that are a plurality of differences between the start position and a plurality of positions of the operation body obtained when the operation body is on a first side in the one direction with respect to the start position, stores a second maximum value in the storage unit, the second maximum value being a maximum value among a plurality of second amounts of movement that are a plurality of differences between the start position and a plurality of positions of the operation body obtained when the operation body is on a second side opposite to the first side in the one direction with respect to the start position, and outputs the direction of movement corresponding to a larger one of the first maximum value and the second maximum value as the direction of movement of the operation body.

Appendix 5

The electrostatic input device according to appendix 4, in which when a predetermined time elapses after the state in which the operation body is not close to the plurality of electrostatic sensor electrodes changes to the state in which the operation body is close to at least one of the plurality of electrostatic sensor electrodes, the control unit outputs the direction of movement corresponding to the larger one of the first maximum value and the second maximum value as the direction of movement of the operation body.

Appendix 6

The electrostatic input device according to appendix 5, in which before the predetermined time elapses after the state in which the operation body is not close to the plurality of electrostatic sensor electrodes changes to the state in which the operation body is close to at least one of the plurality of electrostatic sensor electrodes, if one of the first maximum value and the second maximum value exceeds a first threshold value, the control unit outputs the direction of movement corresponding to the one of the first maximum value and the second maximum value that exceeds the first threshold value as the direction of movement of the operation body.

Appendix 7

The electrostatic input device according to appendix 6, in which before the predetermined time elapses, if the state changes to a state in which the operation body is not close to the plurality of electrostatic sensor electrodes, the control unit outputs the direction of movement corresponding to one of the first maximum value and the second maximum value that exceeds a second threshold value as the direction of movement of the operation body.

Appendix 8

The electrostatic input device according to appendix 7, in which after the predetermined time elapses and the control unit outputs the direction of movement corresponding to the larger one of the first maximum value and the second maximum value as the direction of movement of the operation body, the control unit outputs a difference between the position of the operation body calculated based on the capacitance correction value and the position of the operation body calculated in a calculation cycle immediately before a calculation cycle in which the position of the operation body is calculated as the amount of movement of the operation body.

What is claimed is:

1. An electrostatic input device comprising:

a plurality of electrostatic sensor electrodes arrayed in one direction;

a measurement circuit configured to measure a plurality of capacitances between the plurality of electrostatic sensor electrodes and an operation body;

a storage unit; and a control unit configured to:

calculate a plurality of first positions and a plurality of second positions of the operation body based on a capacitance correction value obtained by subtracting a reference value from the plurality of capacitances measured by the measurement circuit;

determine whether the operation body is close to at least one of the plurality of electrostatic sensor electrodes based on the capacitance correction value; and calculate first and second movement directions and a plurality of first and second movement amounts along the first and second movement directions, respectively, with respect to movement of the operation body, wherein the control unit is further configured to:

store a position of a corresponding electrode of the plurality of electrostatic sensor electrodes close to the operation body in the storage unit as a start position of the operation body when a state in which the operation body is not close to the plurality of electrostatic sensor electrodes changes to a state in which the operation body is close to at least one of the plurality of electrostatic sensor electrodes, the plurality of first positions being located on a first side in the first movement direction with respect to the start position, the plurality of second position being located on a second side in the movement second direction opposite to the first movement direction with respect to the start position;

calculate the plurality of first movement amounts based on a plurality of first differences between the start position and each of the plurality of first positions;

calculate the plurality of second movement amounts based on a plurality of second differences between the start position and each of the plurality of second positions;

store a first maximum value in the storage unit, the first maximum value being a maximum value among the plurality of first movement amounts;

store a second maximum value in the storage unit, the second maximum value being a maximum value among the plurality of second movement amounts; and output one of the first and second movement directions corresponding to a larger one of the first maximum value and the second maximum value.

2. The electrostatic input device according to claim 1, wherein the control unit is further configured to output the larger one of the first maximum value and the second maximum value of the operation body together with the one of the first and second movement directions.

3. The electrostatic input device according to claim 1, wherein the plurality of first movement amounts are the plurality of first differences, respectively, and the plurality of second movement amounts are the plurality of second differences.

4. The electrostatic input device according to claim 1, wherein, when a predetermined time elapses after the state in which the operation body is not close to the plurality of electrostatic sensor electrodes changes to the state in which the operation body is close to at least one of the plurality of electrostatic sensor electrodes, the control unit is configured to output the one of the first and second movement directions corresponding to the larger one of the first maximum value and the second maximum value.

5. The electrostatic input device according to claim 4, wherein after the control unit outputs the one of the first and second movement directions corresponding to the larger one of the first maximum value and the second maximum value as the direction of movement of the operation body, the control unit is further configured to output a further movement amount of the operation body, and the further movement amount corresponds to a further difference between a first position calculated at a first calculation cycle among the plurality of first and second positions and a second position calculated at a second calculation cycle among the plurality of first and second positions, and the second calculation cycle is one cycle prior to the first calculation cycle.

6. The electrostatic input device according to claim 1, wherein, when one of the first maximum value and the second maximum value exceeds a first threshold value before a predetermined time elapses after the state in which the operation body is not close to the plurality of electrostatic sensor electrodes changes to the state in which the operation body is close to at least one of the plurality of electrostatic sensor electrodes, the control unit is further configured to output one of the first and second movement directions corresponding to the one of the first maximum value and the second maximum value that exceeds the first threshold value.

7. The electrostatic input device according to claim 1, wherein the control unit is further configured to output one of the first and second movement directions corresponding to one of the first maximum value and the second maximum value that exceeds a second threshold value under a condition below:

the state in which the operation body is close to at least one of the plurality of electrostatic sensor electrodes changes to the state in which the operation body is not close to the plurality of electrostatic sensor electrodes before a predetermined time elapses after the state in which the operation body is not close to the plurality of electrostatic sensor electrodes changes to the state in which the operation body is close to at least one of the plurality of electrostatic sensor electrodes.

* * * * *